United States Patent
Whitman

[15] 3,682,536
[45] Aug. 8, 1972

[54] AUTOMOTIVE VEHICLE SIDE VIEW PERISCOPE

[72] Inventor: Larry E. Whitman, 27 Fairfield Court, Pittsburgh, Pa. 15201

[22] Filed: July 20, 1970

[21] Appl. No.: 56,556

[52] U.S. Cl..............................350/307, 350/301
[51] Int. Cl. ..............................................G02b 5/08
[58] Field of Search.........350/52, 301, 302, 303, 307

[56] References Cited

UNITED STATES PATENTS

| | | | |
|---|---|---|---|
| 1,478,650 | 12/1923 | Hallengren | 350/52 |
| 2,298,341 | 10/1942 | Brinkley | 350/303 |
| 3,501,218 | 3/1970 | Zitzelberger | 350/307 |
| 2,738,753 | 3/1956 | Eubank | 350/307 |
| 2,501,067 | 3/1950 | Lusebrink | 350/302 |

*Primary Examiner*—David Schonberg
*Assistant Examiner*—Michael J. Tokar
*Attorney*—Brown, Murray, Flick & Peckham

[57] ABSTRACT

The exposed side of an automotive vehicle fender has an opening therein near its front end, and the dashboard likewise has an opening in it behind the fender. A periscope tube extends from the dashboard opening forward beneath the fender to a point beside the fender opening, where the front end portion of the tube has a side opening facing the fender opening. A mirror in the front end of the tube reflects backwardly therethrough the images formed by light rays reflects backwardly therethrough the images formed by light rays entering the fender opening and striking the mirror. A ground glass that closes the dashboard opening reveals these images to the driver of the vehicle.

7 Claims, 8 Drawing Figures

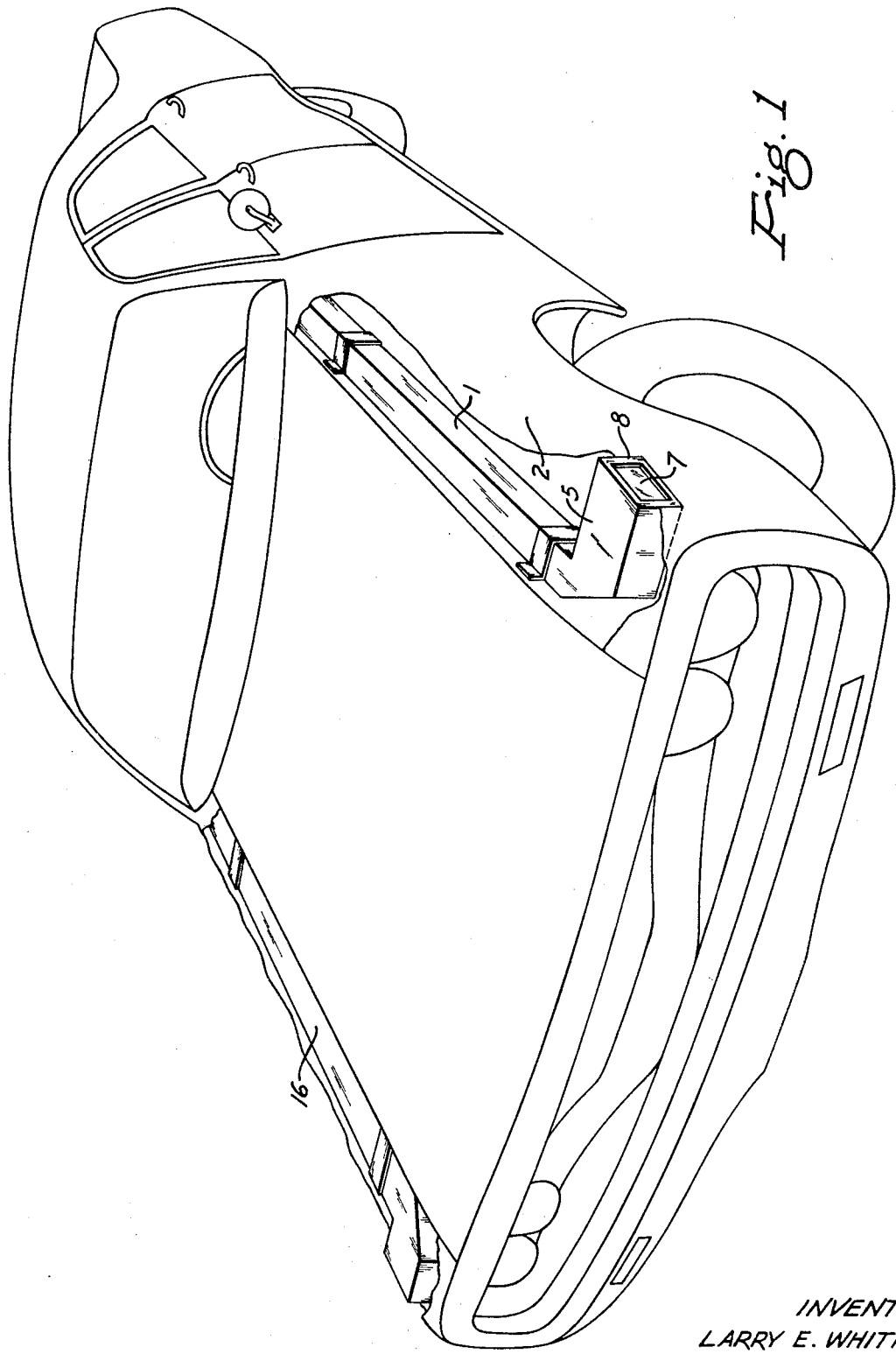

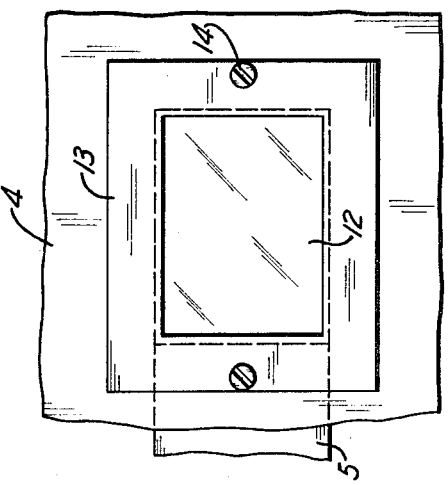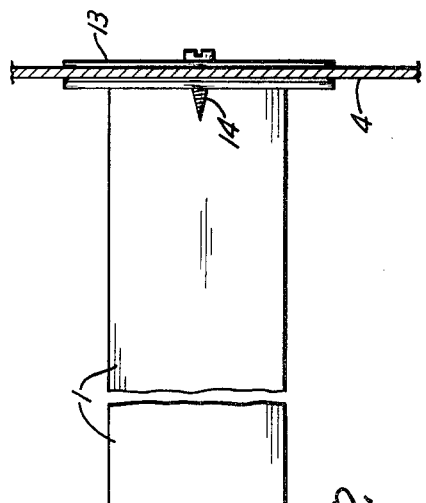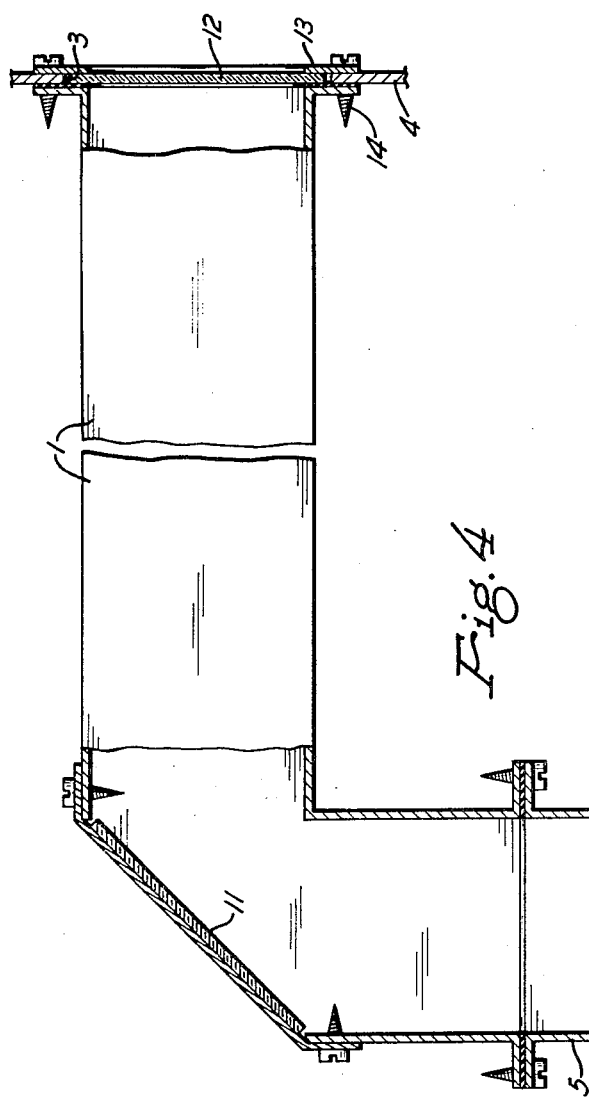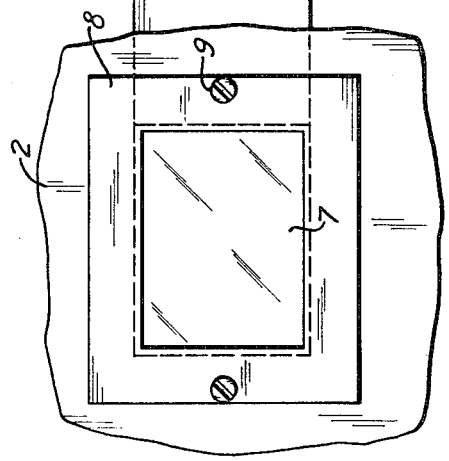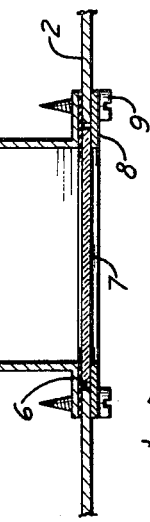

INVENTOR.
LARRY E. WHITMAN
BY
Brown, Murray, Flick & Peckham
ATTORNEYS.

INVENTOR.
LARRY E. WHITMAN
BY
Brown, Murray, Flick & Peckham
ATTORNEYS.

AUTOMOTIVE VEHICLE SIDE VIEW PERISCOPE

Every motorist experiences times when he must drive out of a street or driveway onto a cross street but, due to obstructions to his view at the intersection, he cannot see whether another vehicle is approaching from either direction on the cross street until he has driven his own vehicle out into the cross street far enough to have a clear view to either side. While advancing into the cross street for this purpose, his vehicle may be struck by one that he could not see in time.

It is an object of this invention to provide an automotive vehicle with an optical system that permits the driver to see sideways down an intersecting street without first projecting his vehicle out into it.

The preferred embodiment of the invention is illustrated in the accompanying drawings, in which FIG. 1 is a perspective view of an automobile, with parts broken away in section;

FIG. 2 is an enlarged fragmentary side view of a periscope mounted in the vehicle on the driver's side;

FIG. 3 is a view of the inner or rear end of the periscope;

FIG. 4 is a fragmentary horizontal section of the same periscope;

Figure 5:
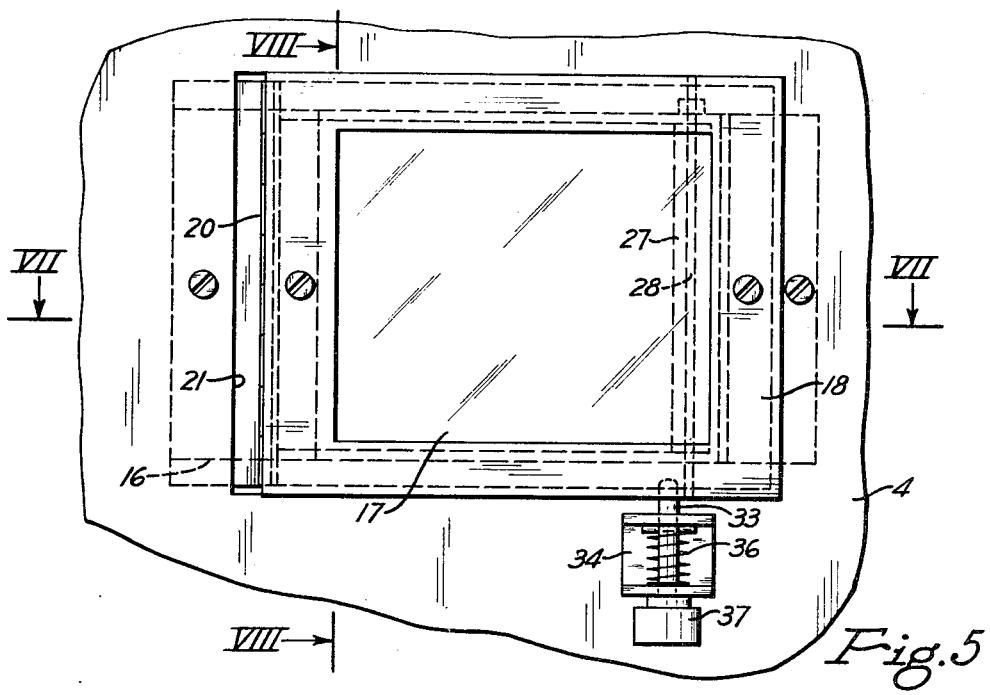
FIG. 5 is an enlarged view, similar to FIG. 3, of the rear end of the periscope at the end of the dashboard opposite the driver.

Referring to FIGS. 1 to 4 of the drawings, the invention may be applied to any automotive vehicle whether it be a truck or an automobile, although it generally will be most useful with the latter. The car may be provided with a periscope on only the driver's side or on both sides as shown. On the driver's side a generally horizontal periscope tube 1 is rigidly mounted lengthwise of the left-hand front fender 2 beneath its top. The tube extends from an opening 3 in the left-hand end of the dashboard 4 to a point near the front end of the fender. At this point the tube has an extension 5 substantially at a right angle to it connecting the tube with an opening 6 in the side of the fender. This opening is closed by a transparent window 7 held in place by a frame 8 and screws 9.

At the intersection of the main tube and its extension there is an upright mirror 11 (FIG. 4) mounted at an angle that will reflect light rays that enter the fender opening back through the tube. Since the driver cannot lean down to look through the tube to see what images are reflected by the mirror, opening 3 in the dashboard is closed by a ground glass 12 on which the reflected images are projected and revealed like a picture. This picture of what would be seen through the fender opening is readily visible to the driver. Therefore, anything moving at the left of the vehicle and which is reflected by the periscope mirror can be seen on the ground glass by the driver, even though he is too far back from the street intersection to see the moving objects directly. With this knowledge, he can avoid a possible accident that might result if he had to drive out into the cross street far enough to see oncoming vehicles directly.

The ground glass is held in place by a frame 13 and screws 14, which also hold the rear end of the periscope tube against the dashboard.

Figure 6:
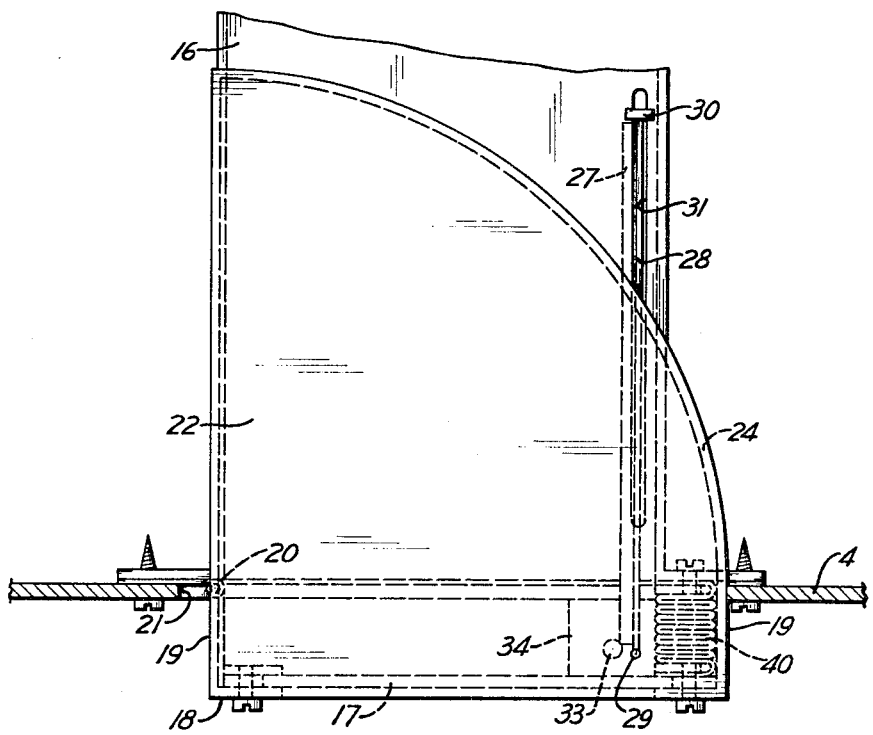
FIG. 6 is a plan view of the rear end portion of the periscope seen in FIG. 5.
Figure 7:
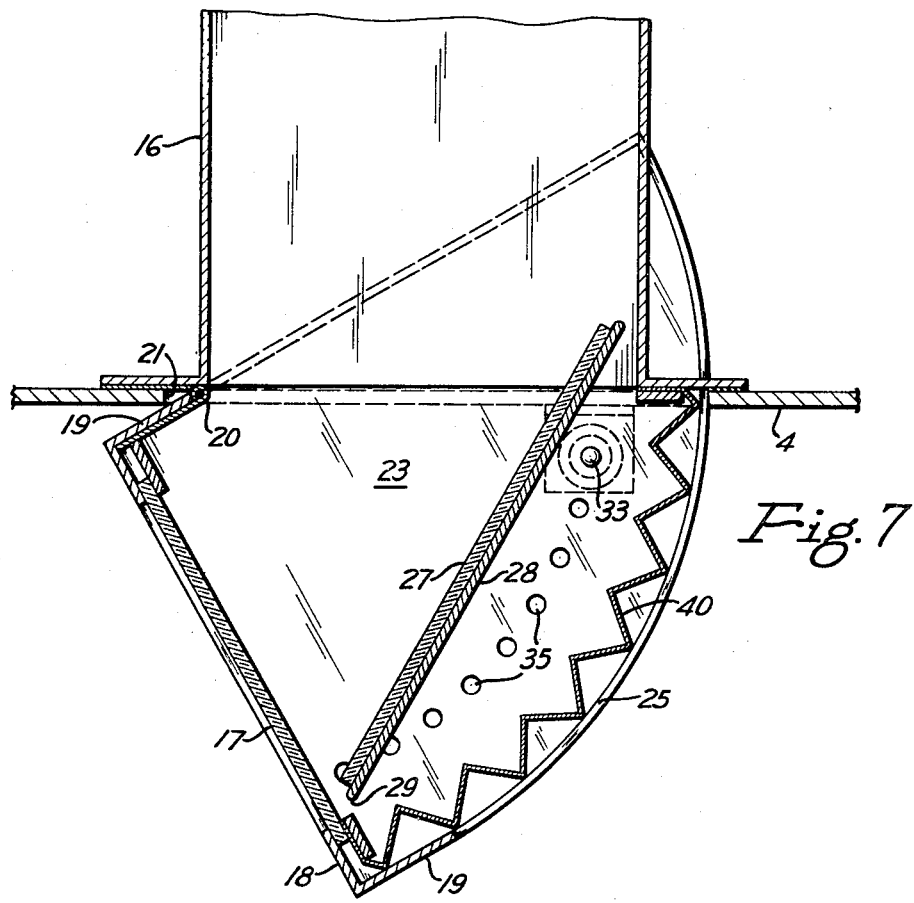
FIG. 7 is a horizontal section taken on the line VII—VII of FIG. 5, but showing the ground glass swung out to its outermost position.

When the vehicle also is equipped with a periscope beneath the right-hand front fender, the construction is the same as just described, except at the dashboard. The opening in the right-hand end of the dashboard is likely to be too far away from the driver for him to see clearly what is projected on the ground glass at the rear end of the periscope tube 16. Therefore, as shown in FIGS. 5 to 8, the glass 17 is mounted in a frame 18 that can be adjusted so that the driver can look directly at it. The frame itself is located a short distance away from the dashboard, but has vertical side flanges 19 extending forward to it. At the driver's side, the frame flange is connected by a vertical hinge 20 to the end of the periscope tube so that the other side of the frame can be swung rearwardly and toward the driver as shown in FIG. 7.

Extending from the top and bottom of the frame forward through the dashboard opening 21 are upper and lower walls 22 and 23 that overlap the top and bottom of the periscope tube. Starting at the right-hand flange 19, walls 22 and 23 are curved in an arc, having the axis of hinge 20 as its center, back and around to the left-hand sides of those walls so that they will not interfere with swinging the frame away from the dashboard. The walls are spaced vertically from the tube, but their edges are provided with vertical flanges 24 and 25 that slide against its top and bottom.

Figure 8:
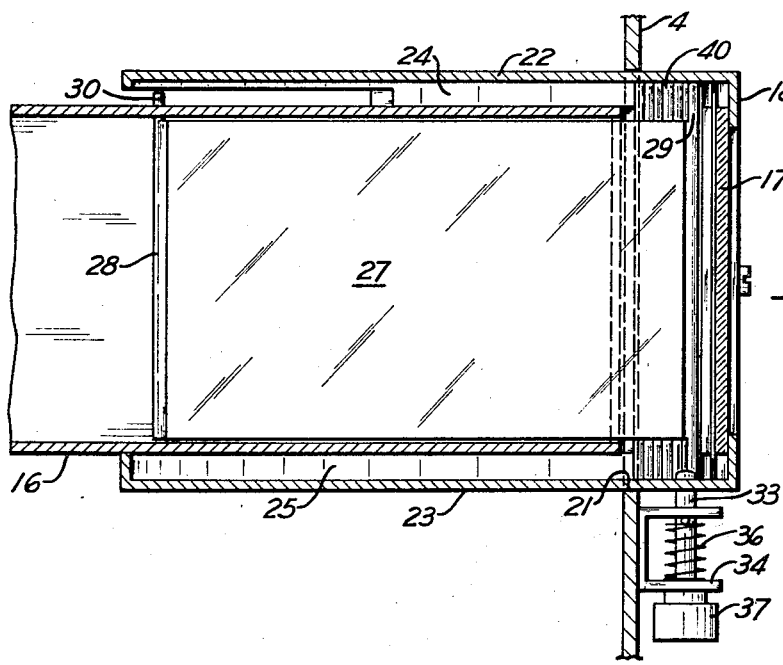
FIG. 8 is a vertical section taken on the line VIII—VIII of FIG. 5.

Inside the periscope tube, along its right-hand side, a vertical mirror 27 is mounted on a plate 28, the front end of which is pivoted on a vertical axis 29 to the top and bottom walls of the frame in front of the tube. At the rear end of the plate there is a guide pin 30 that extends up through a longitudinal slot 31 (FIG. 6) in the top of the tube. While the frame is closed, the mirror is parallel to the sides of the tube as shown in FIGS. 6 and 8. When the frame and ground glass are swung away from the dashboard, the frame pulls the plate and mirror part-way out of the tube, with the guide pin sliding in the slot. This turns the mirror to the correct angle for reflecting light rays from the front mirror in the tube onto the ground glass 17.

The frame can be locked in several different adjusted positions by means of a vertical pin 33 slidably mounted in a bracket 34 attached to the dashboard beneath opening 21. The pin normally projects up through one of a series of holes 35 (FIG. 7) in the bottom wall 23 of the frame. A coil spring 36 on the pin holds it in its upper locking position, but it can be pulled down by a knob 37 on its lower end to disengage it.

To prevent light from entering the right-hand side of the frame when it is swung out, an accordian pleated flexible curtain 40 is secured to the right-hand side of the frame and to the corresponding side of the front end of the periscope tube. This curtain extends from top wall 22 to bottom wall 23 and overlaps the upper and lower flanges 24 and 25. The curtain is completely folded when the frame is closed against the dashboard, as shown in FIG. 6. It is unfolded as the frame is swung out, as shown in FIG. 7.

By using two periscopes as described herein, the driver of the car can "look both ways" at a blind intersection without first edging his vehicle out into the cross traffic. One accident avoided by the use of these periscopes will more than pay for them.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An automotive vehicle provided with a dashboard and a front fender provided with a downwardly extending outer side wall having an opening therein near its front end, the dashboard having an opening therein behind said fender, the vehicle comprising a generally horizontal periscope tube mounted beneath the top of the fender and extending from said dashboard opening forward to a point beside said fender opening, the front end portion of the tube having a side opening therein facing the fender opening, a mirror in the front end of the tube in a position to reflect backwardly through the tube images formed by light rays entering the fender opening and striking the mirror, a ground glass closing said dashboard opening for revealing said reflected images to the driver of the vehicle, means pivotally mounting one edge of said ground glass on a vertical axis at the inner side of said dashboard opening to permit the opposite edge of the glass to be swung away from the tube and dashboard, and an upright mirror in the rear end of the tube movable with said glass into a position to reflect said reflected images onto the glass.

2. An automotive vehicle according to claim 1, including means for locking said glass in different positions.

3. An automotive vehicle according to claim 1, including means hinging one edge of said upright mirror on a vertical axis adjacent said opposite edge of the ground glass.

4. An automotive vehicle according to claim 1, including means hinging one edge of said upright mirror on a vertical axis adjacent said opposite edge of the ground glass, and means slidably supporting the other edge of the upright mirror for movement lengthwise of the tube.

5. An automotive vehicle according to claim 4, including means for locking said glass in different positions.

6. An automotive vehicle according to claim 1, including means spanning the space between the dashboard opening and the edges of the ground glass to prevent unwanted light from reaching the glass.

7. An automotive vehicle according to claim 6, in which said means include an accordian pleated curtain.

* * * * *